US006621852B2

United States Patent
Vanderpool

(10) Patent No.: US 6,621,852 B2
(45) Date of Patent: *Sep. 16, 2003

(54) SPREAD SPECTRUM WIRELESS COMMUNICATION SYSTEM

(75) Inventor: Jeffrey S. Vanderpool, Colorado Springs, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/023,090

(22) Filed: Dec. 14, 2001

(65) Prior Publication Data

US 2002/0085618 A1 Jul. 4, 2002

Related U.S. Application Data

(63) Continuation of application No. 09/256,617, filed on Feb. 23, 1999, now Pat. No. 6,421,368, which is a continuation of application No. 08/929,485, filed on Sep. 15, 1997, now Pat. No. 6,115,412, which is a continuation of application No. 08/611,064, filed on Mar. 4, 1996, now abandoned, which is a continuation of application No. 08/192,707, filed on Feb. 7, 1994, now Pat. No. 5,497,424, which is a division of application No. 07/712,239, filed on Jun. 7, 1991, now Pat. No. 5,285,469, which is a continuation-in-part of application No. 07/709,712, filed on Jun. 3, 1991, now abandoned.

(51) Int. Cl.[7] .............................. H04B 1/69; H04B 5/16
(52) U.S. Cl. ........................ 375/130; 375/220; 455/445
(58) Field of Search ................................. 375/130, 219, 375/220; 370/311, 334, 328, 329, 331; 455/445, 507, 515, 554, 555; 379/196, 197, 198, 225, 231, 232, 234

(56) References Cited

U.S. PATENT DOCUMENTS

| 3,663,762 A | 5/1972 | Joel, Jr. |
| RE27,738 E | 8/1973 | Honma et al. |
| 3,934,203 A | 1/1976 | Schiff |

(List continued on next page.)

FOREIGN PATENT DOCUMENTS

| AU | 3984485 | 9/1985 |
| EP | 0 211 460 A2 | 7/1986 |

(List continued on next page.)

OTHER PUBLICATIONS

Anwendung der Spread–Spectrum–Technik in dem hybriden Mobilfunksystem MATS–D (Spread Spectrum Application in the Hybrid Mobile Radio System MATS–D), Eizenhöfer, 40 (1986) Sep.–Oct., No. 9/10.

(List continued on next page.)

Primary Examiner—Don N. Vo
(74) Attorney, Agent, or Firm—Blakely, Sokoloff, Taylor & Zafman LLP

(57) ABSTRACT

A wireless communication system employing spread-spectrum communication techniques includes a plurality of base stations that may be coupled directly or indirectly to a telephone network, and may initiate or receive calls on the telephone network. A plurality of user stations may include a spread-spectrum transmitter and receiver and may provide for dynamic connection to selected base stations. In one embodiment, one or more of the base stations may include an augmented base station and include means for communicating with the user stations over an alternative communication path distinct from a spread-spectrum path, such as over a cellular communication path.

7 Claims, 1 Drawing Sheet

U.S. PATENT DOCUMENTS

| | | |
|---|---|---|
| 3,978,436 A | 8/1976 | Alig et al. |
| 4,021,898 A | 5/1977 | Willis et al. |
| 4,051,448 A | 9/1977 | Coussot |
| 4,100,498 A | 7/1978 | Alsup et al. |
| 4,131,484 A | 12/1978 | Caruso et al. |
| 4,163,944 A | 8/1979 | Chambers et al. |
| 4,189,677 A | 2/1980 | Cooper et al. |
| 4,217,563 A | 8/1980 | Vale |
| 4,222,115 A | 9/1980 | Cooper et al. |
| 4,247,942 A | 1/1981 | Hauer |
| 4,285,060 A | 8/1981 | Cobb et al. |
| 4,301,530 A | 11/1981 | Gutleber |
| 4,314,393 A | 2/1982 | Wakatsuki et al. |
| 4,355,411 A | 10/1982 | Reudink et al. |
| 4,418,393 A | 11/1983 | Zscheile, Jr. |
| 4,418,425 A | 11/1983 | Fennel, Jr. et al. |
| 4,425,642 A | 1/1984 | Moses et al. |
| 4,425,661 A | 1/1984 | Moses et al. |
| 4,432,089 A | 2/1984 | Wurzburg et al. |
| 4,445,256 A | 5/1984 | Huguenin et al. |
| 4,455,651 A | 6/1984 | Baran |
| 4,456,793 A | 6/1984 | Baker et al. |
| 4,479,226 A | 10/1984 | Prabhu et al. |
| 4,484,028 A | 11/1984 | Kelley et al. |
| 4,517,679 A | 5/1985 | Clark et al. |
| 4,525,835 A | 7/1985 | Vance et al. |
| 4,550,414 A | 10/1985 | Guinon et al. |
| 4,554,668 A | 11/1985 | Deman et al. |
| 4,561,089 A | 12/1985 | Rouse et al. |
| 4,562,370 A | 12/1985 | Von Dach |
| 4,563,774 A | 1/1986 | Gloge |
| 4,567,588 A | 1/1986 | Jerrim |
| 4,569,062 A | 2/1986 | Dellande et al. |
| 4,587,662 A | 5/1986 | Langewellpott |
| 4,601,047 A | 7/1986 | Horwitz et al. |
| 4,606,039 A | 8/1986 | Nicolas et al. |
| 4,612,637 A | 9/1986 | Davis et al. |
| 4,621,365 A | 11/1986 | Chiu |
| 4,622,854 A | 11/1986 | Locke et al. |
| 4,641,317 A | 2/1987 | Fullerton |
| 4,642,505 A | 2/1987 | Arvanitis |
| 4,647,863 A | 3/1987 | Skudera et al. |
| 4,649,549 A | 3/1987 | Halpern et al. |
| 4,653,069 A | 3/1987 | Roeder |
| 4,658,096 A | 4/1987 | West et al. |
| 4,660,164 A | 4/1987 | Leibowitz |
| 4,672,254 A | 6/1987 | Dolat et al. |
| 4,672,658 A | 6/1987 | Kavehrad et al. |
| 4,675,863 A | 6/1987 | Paneth et al. |
| 4,680,785 A | 7/1987 | Akiyama |
| 4,680,786 A | 7/1987 | Baker et al. |
| 4,688,210 A | 8/1987 | Eizenhöfer et al. |
| 4,691,326 A | 9/1987 | Tauchiya |
| 4,701,904 A | 10/1987 | Darcie |
| 4,703,474 A | 10/1987 | Foschini et al. |
| 4,707,839 A | 11/1987 | Andren et al. |
| 4,718,080 A | 1/1988 | Serrano et al. |
| 4,724,435 A | 2/1988 | Moses et al. |
| 4,742,512 A | 5/1988 | Akashi et al. |
| 4,745,378 A | 5/1988 | Niitsuma et al. |
| 4,754,453 A | 6/1988 | Eizenhöfer |
| 4,754,473 A | 6/1988 | Edwards |
| 4,759,034 A | 7/1988 | Nagazumi |
| 4,759,078 A | 7/1988 | Schiller |
| 4,765,753 A | 8/1988 | Schmidt |
| 4,769,812 A | 9/1988 | Shimizu |
| 4,774,715 A | 9/1988 | Messenger |
| 4,787,093 A | 11/1988 | Rorden |
| 4,800,885 A | 1/1989 | Johnson |
| 4,804,938 A | 2/1989 | Rouse et al. |
| 4,805,208 A | 2/1989 | Schwartz |
| 4,807,222 A | 2/1989 | Amitay |
| 4,813,057 A | 3/1989 | Fullerton |
| 4,815,106 A | 3/1989 | Propp et al. |
| 4,833,702 A | 5/1989 | Shitara et al. |
| 4,837,786 A | 6/1989 | Gurantz et al. |
| 4,837,802 A | 6/1989 | Higashiyama et al. |
| 4,860,307 A | 8/1989 | Nakayama |
| 4,866,732 A | 9/1989 | Carey et al. |
| 4,878,238 A | 10/1989 | Rash et al. |
| 4,893,327 A | 1/1990 | Stern et al. |
| 4,894,842 A | 1/1990 | Broekhoven et al. |
| 4,901,307 A | 2/1990 | Gilhousen et al. |
| 4,905,221 A | 2/1990 | Ichiyoshi |
| 4,912,705 A | 3/1990 | Paneth et al. |
| 4,918,689 A | 4/1990 | Hui |
| 4,918,690 A | 4/1990 | Markkula, Jr. et al. |
| 4,928,274 A | 5/1990 | Gilhousen et al. |
| 4,943,973 A | 7/1990 | Werner |
| 4,965,759 A | 10/1990 | Uchida et al. |
| 4,979,170 A | 12/1990 | Gilhousen et al. |
| 4,979,186 A | 12/1990 | Fullerton |
| 4,980,907 A | 12/1990 | Raith et al. |
| 4,984,247 A | 1/1991 | Kaufmann et al. |
| 4,995,083 A | 2/1991 | Baker et al. |
| 5,005,183 A | 4/1991 | Carey et al. |
| 5,008,953 A | 4/1991 | Dahlin et al. |
| 5,016,255 A | 5/1991 | Dixon et al. |
| 5,018,165 A | 5/1991 | Sohner et al. |
| 5,022,024 A | 6/1991 | Paneth et al. |
| 5,022,046 A | 6/1991 | Morrow, Jr. |
| 5,022,047 A | 6/1991 | Dixon et al. |
| 5,023,887 A | 6/1991 | Takeuchi et al. |
| 5,025,452 A | 6/1991 | Sohner et al. |
| 5,029,183 A * | 7/1991 | Tymes ........................ 370/311 |
| 5,042,050 A | 8/1991 | Owen |
| 5,046,066 A * | 9/1991 | Messenger .................. 370/334 |
| 5,056,109 A | 10/1991 | Gilhousen et al. |
| 5,063,560 A | 11/1991 | Yerbury et al. |
| 5,073,899 A | 12/1991 | Collier et al. |
| 5,073,900 A | 12/1991 | Mallinckrodt |
| 5,093,840 A | 3/1992 | Schilling |
| 5,101,501 A | 3/1992 | Gilhousen et al. |
| 5,103,459 A | 4/1992 | Gilhousen et al. |
| 5,109,390 A | 4/1992 | Gilhousen et al. |
| 5,117,423 A | 5/1992 | Shepherd et al. |
| 5,119,375 A | 6/1992 | Paneth et al. |
| 5,121,391 A | 6/1992 | Paneth et al. |
| 5,150,377 A | 9/1992 | Vannucci |
| 5,161,168 A | 11/1992 | Schilling |
| 5,166,929 A | 11/1992 | Lo |
| 5,177,765 A | 1/1993 | Holland et al. |
| 5,177,766 A | 1/1993 | Holland et al. |
| 5,185,762 A | 2/1993 | Schilling |
| 5,193,101 A | 3/1993 | McDonald et al. |
| 5,216,691 A | 6/1993 | Kaufmann |
| 5,218,618 A | 6/1993 | Sagey |
| 5,224,120 A | 6/1993 | Schilling |
| 5,228,053 A | 7/1993 | Miller et al. |
| 5,231,646 A | 7/1993 | Heath et al. |
| 5,239,572 A | 8/1993 | Saegusa et al. |
| 5,263,045 A | 11/1993 | Schilling |
| 5,265,119 A | 11/1993 | Gilhousen et al. |
| 5,267,262 A | 11/1993 | Wheatley, III |
| 5,274,665 A | 12/1993 | Schilling |
| 5,280,472 A | 1/1994 | Gilhousen et al. |
| 5,285,469 A | 2/1994 | Vanderpool |
| 5,289,497 A | 2/1994 | Jacobson et al. |
| 5,299,226 A | 3/1994 | Schilling |
| 5,303,286 A | 4/1994 | Wiedeman |
| 5,319,634 A | 6/1994 | Bartholomew et al. |

| | | | |
|---|---|---|---|
| 5,351,269 A | 9/1994 | Schilling | |
| 5,392,287 A | 2/1995 | Tiedemann, Jr. et al. | |
| 5,402,413 A | 3/1995 | Dixon | |
| 6,115,412 A * | 9/2000 | Vanderpool | 375/130 |
| 6,243,370 B1 | 6/2001 | Schilling | |

FOREIGN PATENT DOCUMENTS

| | | | |
|---|---|---|---|
| EP | 0 219 085 | 4/1987 | |
| EP | 0 326 104 | 2/1989 | |
| EP | 0 361 299 | 4/1990 | |
| JP | 61-248698 | 11/1986 | H04Q/7/00 |
| JP | 62-285533 | 12/1987 | H04B/7/24 |
| JP | 64-42932 | 2/1989 | H04B/7/26 |
| JP | 3126333 | 5/1991 | |
| JP | 3-126333 | 5/1991 | H04B/7/26 |
| WO | 8700370 | 1/1987 | |
| WO | WO 91/07020 | 5/1991 | |
| WO | 9107036 | 5/1991 | |
| WO | 9315573 | 8/1993 | |
| WO | 9318596 | 9/1993 | |
| WO | 9318601 | 9/1993 | |
| WO | 9406217 | 3/1994 | |

OTHER PUBLICATIONS

Collins, J.H. et al., *The Role of Surface Acoustic Wave Technology in Communication Systems*, Ultrasonics, 10(2):59–71, Mar. 1972.

Dixon, Robert C., *Spread Spectrum Systems*, (J. Wiley & Sons, 2d ed. 1984).

Eschenbach, Ralph, *Applications of Spread Spectrum Radio to Indoor Data Communications*, Proc. of the IEEE, 1982, pp. 34.5–1–34.5–3.

Freret, Payne et al., *Applications of Spread–Spectrum Radio to Wireless Terminal Communications*, Proceedings of the IEEE, 1980, pp. 69.7.1–69.7.4.

Freret, Payne, *Wireless Terminal Communications Using Spread–Spectrum Radio*, Proceedings of the IEEE, 1980, pp. 244–248.

Kavehrad, M. et al., *Performance of Low–Complexity Channel Coding and Diversity for Spread–Spectrum in Indoor, Wireless Communication*, AT&T Tech. Journal, 64(8):1927–1965, Oct. 1985.

Kavehrad, Moshen et al., *Direct Sequence Spread Spectrum with DPSK Modulation and Diversity for Indoor Wireless Communications*, IEEE Trans. on Comms., Com–35(2):224–226, Feb. 1987.

Kavehrad, M. et al., *Spread Spectrum for Indoor Digital Radio*, IEEE Communications Magazine, 25(5):32–40, Jun. 1987.

Unkauf, Manfred G., "Surface Wave Devices in Spread Spectrum Systems," reprinted in H. Matthews (ed.), *Surface Wave Filters* (Wiley 1977), pp. 477–509.

* cited by examiner

SPREAD SPECTRUM WIRELESS COMMUNICATION SYSTEM

CROSS-REFERENCE TO RELATED APPLICATION

This application is a continuation application of U.S. application Ser. No. 09/256,617 filed Feb. 23, 1999, now U.S. Pat. No. 6,421,368, which is a continuation application of U.S. application Ser. No. 08/929,485 filed Sep. 15, 1997, now U.S. Pat. No. 6,115,412, which is a continuation application of U.S. application Ser. No. 08/611,064 filed Mar. 4, 1996, now abandoned, which is a continuation application of U.S. application Ser. No. 08/192,707 filed Feb. 7, 1994, now U.S. Pat. No. 5,497,424, which is a divisional of U.S. application Ser. No. 07/712,239 filed Jun. 7, 1991, now U.S. Pat. No. 5,285,469, which is a continuation-in-part of U.S. application Ser. No. 07/709,712 filed Jun. 3, 1991, now abandoned.

BACKGROUND OF THE INVENTION

1. Field of the Invention

This invention relates to a spread spectrum wireless telephone system.

2. Description of Related Art

Access to telephone networks, may commonly occur via one of two general mechanisms, termed "private access" and "public access". As used herein, "private access" means access by means of dedicated circuits (and includes business telephones through PBX, Centrex, and key-type systems, and home telephones), while "public access" means access by means of common communication channels (and includes cellular telephones and payphones). Interconnection to a public switched telephone network (PSTN) for both private access and public access may make use of cable, fiber optic, wire, or radio frequency links, or other methods of communication known in the art. Many telephone networks, have a large number of telephones which are hardwired into the network and which have private access to the network from fixed locations.

One problem which has arisen in the art is the desire of mobile persons to have convenient and inexpensive access to telephone networks. These persons generally have a choice between locating a private-access business or home telephone, or a public-access payphone, which can be inconvenient, and using cellular telephone service, which can be expensive. Accordingly, it would be advantageous to provide a relatively convenient and inexpensive system which allows public access to telephone networks.

Moreover, public access to telephone networks is subject to a number of problems, due in part to the public nature of the communication channel. Such communication may be subject to eavesdropping and other security risks, and may also be subject to unpredictable loss, noise, interference, and even active jamming. Many of these problems are ameliorated by spread-spectrum radio communication, in which transmitted signals are spread across a bandwidth which is wider than the bandwidth of the signal. Spread-spectrum communication may also be used in conjunction with CDMA, FDMA, TDMA, and other multiplexing techniques, and thus may offer advantages in a switching network.

One method of public access to telephone networks is shown in U.S. Pat. No. 4,878,238. While the system shown therein may achieve the goal of public access to a telephone network, it is subject to the drawback that it is not able to achieve the advantages of spread-spectrum communication. Moreover, the system shown therein has little or no ability to handoff user stations from one base station to another when conditions warrant. It would be advantageous to allow public access to the telephone network with relatively inexpensive user stations and which achieve this and other advantages of spread-spectrum communication.

Some aspects of the art of spread spectrum wireless communication are shown in U.S. Pat. Nos. 5,016,255 (issued May 14, 1991) and 5,022,047 (issued Jun. 4, 1991), and in the following copending applications: Ser. No. 07/682,050, filed Apr. 8, 1991, in the name of inventor Robert C. Dixon, titled "THREE-CELL WIRELESS COMMUNICATION SYSTEM", and Ser. No. 07/600,772, filed Oct. 23, 1990, in the name of inventors Robert C. Dixon and Jeffrey S. Vanderpool, titled "METHOD AND APPARATUS FOR ESTABLISHING SPREAD SPECTRUM COMMUNICATIONS". Each of these patents and applications is hereby incorporated by reference as if fully set forth herein.

Another aspect of the problem of access to telephone networks is the desire for mobile persons to be able to contact each other, for example, when these persons are closely located. Access by each such person to a telephone network would allow for them to contact each other, but it might place excess burden on the telephone network and might result in unwarranted delays in making such contacts. Accordingly, it would be advantageous to provide a relatively convenient and inexpensive system which allows contact between multiple user stations which have access (either private or public) to telephone networks.

One method of wireless contact between a plurality of user stations is shown in U.S. Pat. No. 4,672,658. While the system shown therein may achieve the goal of operating a wireless PBX, it is subject to the drawback that it may require complex and relatively expensive user stations, and may not be smoothly integrated into a system for access to telephone networks. Accordingly, it would be advantageous to provide private exchange telephone systems (including PBX, Centrex, or key-type systems) which can be smoothly integrated in a system for providing access (either private or public) to telephone networks with relatively inexpensive user stations.

Another development in the art of telephone networks is the "intelligent network", used herein to mean a telephone network in which enhanced telephone network services are performed by an independent processor, rather than by a local switch or a local switching processor. In an intelligent network, a telephone caller can communicate directly with the independent processor, for controlling enhanced telephone network features. Examples of these enhanced features are call routing and call screening.

Some of these enhanced features are useful for rerouting messages from one telephone to another, while others are useful for caching messages while a person is not available at a particular telephone. Both of these purposes are quite suited to mobile persons who frequently access telephone networks. Moreover, enhanced features add to the value of having a telephone and thus encourage mobile persons to use mobile telephones. Accordingly, it would be advantageous if enhanced features were available to mobile telephones.

SUMMARY OF THE INVENTION

The invention provides a system for accessing a telephone system, in which a set of user stations are matched with a set of base stations for connection to a telephone network. Base stations may be coupled directly or indirectly to the telephone network and may be capable of initiating or receiving calls on the telephone network. User stations may be mobile, may comprise a spread-spectrum transmitter or receiver and may be capable of dynamic connection to selected base stations. A plurality of base stations may be coupled to a private exchange telephone system for coupling user stations in calls outside the telephone network.

In embodiments of the invention, user stations may use CDMA, FDMA, TDMA or other multiple-access techniques to obtain one or more clear communication paths to base stations. Base stations may be placed at convenient locations or may themselves be mobile. User stations may make and break connections with base stations as the user station moves between service regions, or is otherwise more advantageously serviced by, base stations. User stations may direct requests to and receive information from an enhanced telephone services processor, so as to obtain enhanced telephone services within the telephone network. Base stations may be coupled to each other by means of a private exchange telephone system or other small business telephone system (such as a PBX, Centrex, or key-type system) so as to couple user stations in calls outside the telephone network. User stations may also be coupled directly or indirectly to the telephone network on their own or by another access path, such as narrowband or spread-spectrum cellular telephone circuits.

BRIEF DESCRIPTION OF THE DRAWINGS

The FIGURE shows a wireless communication system coupled to a telephone network.

DESCRIPTION OF THE PREFERRED EMBODIMENT

Figure 1:
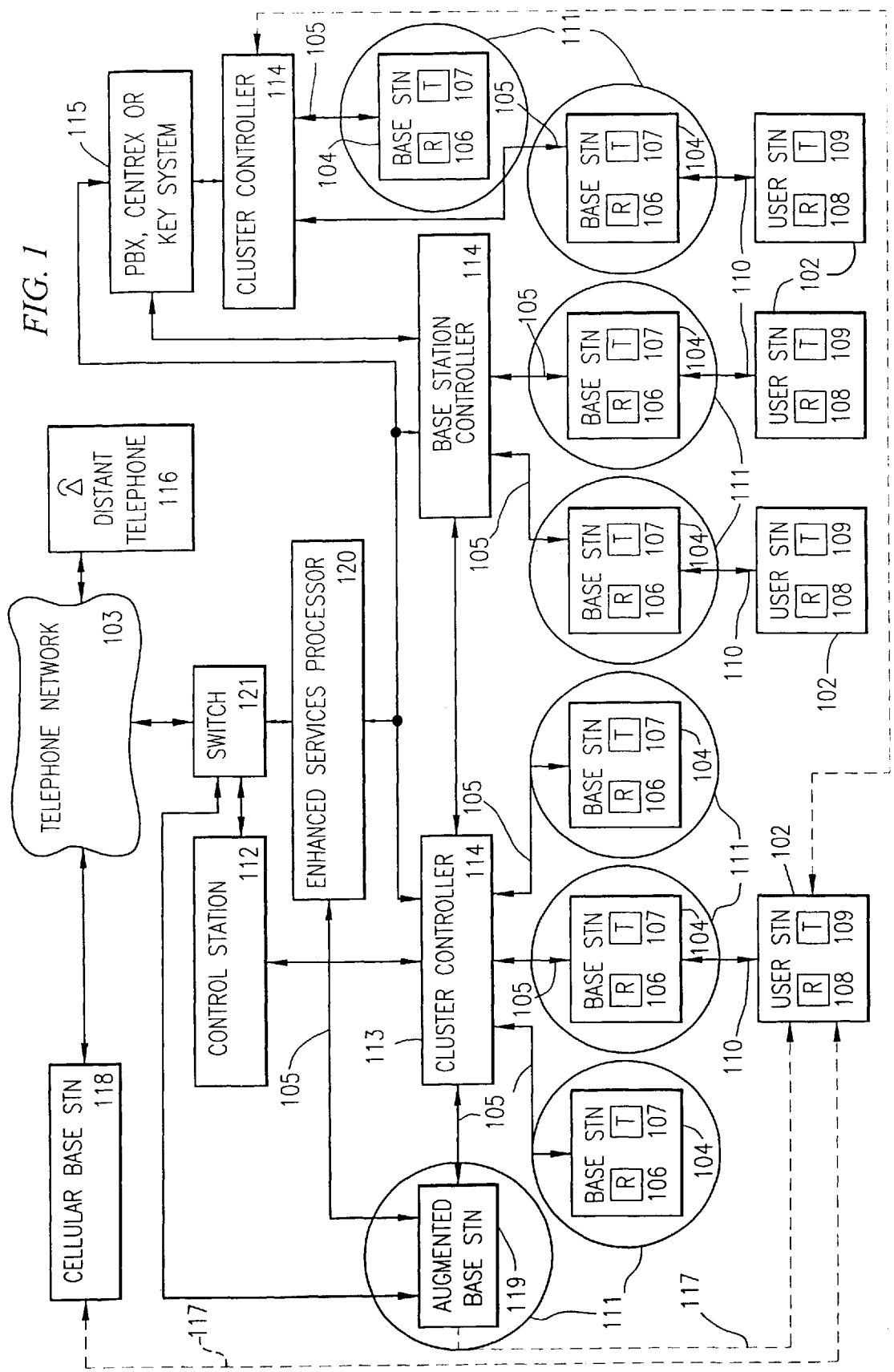

The FIGURE shows a wireless communication system coupled to a telephone network.

A wireless communication system 101 for communication between a user station 102 and a telephone network 103 includes a base station 104, which is coupled to the telephone network 103 by means of a telephone link 105. The base stations 104 each generally comprise a base station receiver 106 and a base station transmitter 107, and the user stations 102 each generally comprise a user station receiver 108 and a user station transmitter 109 (although some base stations 104 or some user stations 102 may be receive-only or transmit-only, e.g. for emergency signals or locationing information), and may be coupled by a spread-spectrum communication link 110.

In a preferred embodiment, the telephone link 105 may comprise a private access link, such as cable, fiber optics, or wire, or a laser or microwave link. However, the telephone link 105 may alternatively comprise a public access link, such as a radio channel, a cellular telephone link, or other means. Moreover, the telephone link 105 may alternatively comprise an indirect communication link, such as by means of a switching processor or a different telephone network. It would be clear to one of ordinary skill in the art, after perusal of the specification, drawings and claims herein, that all of these alternative techniques, as well as other and further techniques, would be workable, and are within the scope and spirit of the invention.

The communication link 110 between base stations 104 and user stations 102 may make use of known spread-spectrum techniques, such as those disclosed in patents and applications incorporated by reference herein. These generally provide for distinguishing the base stations 104 and the user stations 102 with logical identifiers such as frequency bands, spread-spectrum codes, timeslots, or station identifiers. The base stations 104 and the user stations 102 may operate on a plurality of spread-spectrum codes, thus performing CDMA, on a plurality of (possibly overlapping) frequency bands, thus performing FDMA, on a plurality of timeslots, thus performing TDMA, with a plurality of station identifiers to be included in messages, or with other multiplexing techniques.

Locations near base stations 104 may generally define a set of cells 111, as in a cellular system. However, there is no particular requirement that the cells 111 will form a convenient repeating pattern or that they will be of uniform size or traffic density. In fact, base stations 104 may be placed at convenient locations, or may themselves be mobile.

If the cells 111 local to base stations 104 overlap, such as when base stations 104 are closely located or when base stations 104 are mobile, techniques for allocating logical identifiers (such as frequency bands, spread-spectrum codes, timeslots, or station identifiers), between base stations 104 and user stations 102, within and among cells 111, may use methods such as those disclosed in patents and applications incorporated by reference herein. In a preferred embodiment, base stations 104 may have logical identifiers allocated by a control station 112 coupled to the telephone network 103 or to a base station 104.

Spread-spectrum communication between base stations 104 and user stations 102 may comprise handoff of user stations 102 from an old base station 104 to a new base station 104. A user station 102 may be handed-off from one base station 104 to another for one of several reasons. For example, the user station 102 may have moved, or may have better radio contact with the new base station 104, such as if the radio environment changes. For example, a large object may move between the user station 102 and the old base station 104). Alternatively, if base stations 104 are located in different parts of the telephone network 103 or controlled by different oversight hardware, such as different area code or telephone exchange, it may be advantageous to handoff a user station 102 from one base station 104 to another for the purpose of using a new area code or telephone exchange.

If handoff occurs while a call on the telephone network 103 is in progress, the old base station 104 or the new base station 104 will direct the telephone network 103 to reroute the call to use the new base station 104, by a message to a rerouting processor 113. The rerouting processor 113 could be a cluster controller 114 for directly controlling a set of base stations 104, a private exchange telephone system 115 such as a PBX, Centrex, or key-type system (or the cluster controller 114 and the private exchange telephone system 115 operating in conjunction), a local switch, a local switching processor, or the control station 112.

Spread-spectrum communication between base stations 104 and user stations 102 may comprise protocol for initiating communication between base stations 104 and user stations 102 like that disclosed in patents and applications incorporated by reference herein. After a base station 104 and a user station 102 initiate communication, the user station 102 may communicate with a distant telephone 116 (which is not necessarily physically distant) on the telephone network 103 by initiating or receiving calls.

In a preferred embodiment, a user station 102 may initiate a call by initiating communication with a base station 104 and directing that base station 104 to initiate a call in the telephone network 103. The base station 104 may direct the telephone network 103 to initiate the call and to make a connection to the distant telephone 116. Communication between the user station 102 and the distant telephone 116 may be coupled from the user station 102 to the base station 104 to the telephone network 103 to the distant telephone 116, and on the reverse path.

Similarly, a user station 102 may receive a call by the base station 104 initiating communication with the user station 102 and directing the user station 102 to receive the call. The base station 104 may receive the call and make the connection from the distant telephone 116. Communication between the distant telephone 116 and the user station 102 may be coupled from the distant telephone 116 to the telephone network 103 to the base station 104 to the user station 102, and on the reverse path.

Spread-spectrum communication between base stations 104 and user stations 102 may comprise CDMA, FDMA, TDMA, and other multiplexing techniques for communication between base stations 104 and user stations 102 without interference, and may also comprise allocation of frequencies, spread-spectrum codes and other communication resources in a region by the control station 112 such as those techniques disclosed in patents and applications incorporated by reference herein.

User stations 102 may also be coupled to the telephone network 103 by an independent access path 117, such as by cellular wireless telephone communication using a cellular base station 118. In a preferred embodiment, user stations 102 may have multiple communication channels (e.g., multiple codes, frequencies, or timeslots), and thus be capable of coupling to a plurality of different base stations 104. An augmented base station 119 may additionally perform the function of the cellular base station 118 in a cellular wireless telephone network, so that a user station 102 which can make an independent access path to the augmented base station 119 may have direct access to the telephone network 103 like a cellular telephone.

An enhanced-services processor 120 coupled to the telephone network 103 may provide enhanced telephone services within the telephone network 103, as is well known in the art. After a base station 104 and a user station 102 initiate communication, the user station 102 may communicate with the enhanced-services processor 120 by initiating or receiving messages between the user station 102 and the enhanced-services processor 120, so as to obtain enhanced telephone services within the telephone network 103 just as if the user station 102 was an ordinary telephone on the telephone network 103.

Other and further details on the nature and operation of enhanced-services processors (also known as "intelligent network" processors or adjunct network processors) may be found in "ADVANCED INTELLIGENT NETWORK RELEASE 1 PROPOSAL" (Issue Nov. 1, 1989), Document No. SR-NPL-001509; "ADVANCED INTELLIGENT NETWORK RELEASE 1 BASELINE ARCHITECTURE" (Issue Mar. 1, 1990), Document No. SR-NPL-001555; "AMERITECH PUBLIC TELEPHONE MESSAGE DELIVERY SERVICE INTERFACE SPECIFICATIONS" (Issue Nov. 1, 1989), Document No. AM-TR-MKT-000046; "INTELLIVIEW NETWORK MANAGEMENT SERVICE TERMINAL INTERFACE SPECIFICATION, BELL ATLANTIC", Document No. TR72511, all published by Bellcore. All of these documents are hereby incorporated by reference as if fully set forth herein.

A plurality of cluster controllers 114 and private exchange telephone systems 115 may be coupled to the enhanced-services processor 120. A plurality of enhanced-services processors 120 may also be coupled to one or more local switches 121 for coupling to the telephone network 103. Moreover, control stations 112 or augmented base stations 119 may be coupled to local switches 121, enhanced-services processors 120, cluster controllers 114 or base stations 104. The cluster controllers 114 may be coupled to each other for direct routing of calls outside the telephone network 103, e.g. by means of known routing methods. The cluster controllers 114 may also be coupled to the private exchange telephone system 115, which may perform routing among them.

In a preferred embodiment, user stations 102 may be coupled to each other in calls outside the telephone network 103. A first user station 102 may initiate a call by initiating communication with a first base station 104 and directing that first base station 104 to initiate a call with a second user station 102. The first base station 104 may route the call to a second base station 104, either directly by couplings between base stations 104 or by means of the private exchange telephone system 115. The second base station 104 may direct the second user station 102 (coupled to the second base station 104) to receive the call. Communication between the first user station 102 and the second user station 102 may be coupled from the first user station 102 to the first base station 104 to the private exchange telephone system 115 to the second base station 104 to the second user station 102, and on the reverse path.

In a preferred embodiment, if handoff of user stations 102 from an old base station 104 to a new base station 104 occurs while a call outside the telephone network 103 is in progress, the old base station 104 or the new base station 104 may direct the private exchange telephone system 115 to reroute the call to use the new base station 104.

Alternative Embodiments

While preferred embodiments are disclosed herein, many variations are possible which remain within the concept and scope of the invention, and these variations would become clear to one of ordinary skill in the art after perusal of the specification, drawings and claims herein.

I claim:

1. A wireless communication system, comprising:

a first base station coupled to a telephone network;

a first user station configured for completing a first communication path with said first base station and configured for initiating and receiving a call on the telephone network, the first communication path employing a spread-spectrum communication technique;

a second base station coupled to the telephone network;

a second user station configured for completing a second communication path with said second base station and configured for initiating and receiving a call on the telephone network, the second communication path employing a spread-spectrum communication technique; and a private exchange telephone system coupled between said first base station and said second base station, said private exchange telephone system being configured for routing a call between said first user station and said second user station without use of the telephone network.

2. The system of claim 1, wherein said first and second base stations are coupled to the telephone network through said private exchange telephone system.

3. The system of claim 1, wherein said private exchange telephone system comprises a PBX.

4. The system of claim 1, wherein said private exchange telephone system comprises a Centrex system.

5. The system of claim 1, wherein said private exchange telephone system comprises a key-type system.

6. The system of claim 1, wherein said first user station is configured for breaking the first communication path with said first base station and completing a third communication path with said second base station.

7. The system of claim 6, wherein said first user station is configured for being handed-off from said first base station to said second base station.

* * * * *